(12) United States Patent
Agrawal et al.

(10) Patent No.: US 10,708,189 B1
(45) Date of Patent: Jul. 7, 2020

(54) PRIORITY-BASED FLOW CONTROL

(71) Applicant: Barefoot Networks, Inc., Palo Alto, CA (US)

(72) Inventors: Anurag Agrawal, Santa Clara, CA (US); Yi Li, Fremont, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 59 days.

(21) Appl. No.: 15/374,820

(22) Filed: Dec. 9, 2016

(51) Int. Cl.
| | |
|---|---|
| *H04L 12/825* | (2013.01) |
| *H04L 12/935* | (2013.01) |
| *H04L 12/801* | (2013.01) |
| *H04L 12/861* | (2013.01) |
| *H04L 12/26* | (2006.01) |
| *H04L 12/823* | (2013.01) |
| *H04L 12/851* | (2013.01) |
| *H04L 12/835* | (2013.01) |
| *H04L 12/863* | (2013.01) |
| *H04L 12/931* | (2013.01) |

(52) U.S. Cl.
CPC ............ *H04L 47/266* (2013.01); *H04L 43/16* (2013.01); *H04L 47/2441* (2013.01); *H04L 47/29* (2013.01); *H04L 47/30* (2013.01); *H04L 47/32* (2013.01); *H04L 47/6215* (2013.01); *H04L 47/6295* (2013.01); *H04L 49/3027* (2013.01); *H04L 49/3063* (2013.01); *H04L 49/506* (2013.01); *H04L 49/9047* (2013.01); *H04L 49/9084* (2013.01)

(58) Field of Classification Search
CPC ..... H04L 43/16; H04L 47/29; H04L 47/2441; H04L 47/266; H04L 47/30; H04L 47/32; H04L 47/6215; H04L 47/6295; H04L 49/3063; H04L 49/3027; H04L 49/506; H04L 49/9047; H04L 49/9084
See application file for complete search history.

(56) References Cited

U.S. PATENT DOCUMENTS

| | | | |
|---|---|---|---|
| 6,442,172 B1 | 8/2002 | Wallner et al. | |
| 6,480,911 B1 | 11/2002 | Lu | |
| 6,876,668 B1 | 4/2005 | Chawla et al. | |
| 7,418,523 B2 | 8/2008 | Pettyjohn et al. | |
| 7,826,371 B2 | 11/2010 | Hirayama et al. | |

(Continued)

FOREIGN PATENT DOCUMENTS

EP      3229424 A1      10/2017

OTHER PUBLICATIONS

Wikipedia, definition of IEEE P802.1p, https://en.wikipedia.org/wiki/IEEE_P802.1p, Jul. 2018. (Year: 2018).*

(Continued)

*Primary Examiner* — Joshua Kading
(74) *Attorney, Agent, or Firm* — Compass IP Law PC

(57) ABSTRACT

Some embodiments provide a method for a hardware forwarding element. The method adds a received packet to a buffer. The method determines whether adding the packet to the buffer causes the buffer to pass one of multiple flow control thresholds, each of which corresponds to a different packet priority. When adding the packet to the buffer causes the buffer to pass a particular flow control threshold corresponding to a particular priority, the method generates a flow control message for the particular priority.

19 Claims, 12 Drawing Sheets

(56) References Cited

U.S. PATENT DOCUMENTS

| | | |
|---|---|---|
| 7,916,638 B2 | 3/2011 | Lim et al. |
| 8,077,611 B2 | 12/2011 | Bettink et al. |
| 8,254,403 B2 | 8/2012 | Hashimoto |
| 8,615,013 B2 | 12/2013 | Sonnier et al. |
| 8,619,787 B2 | 12/2013 | Sonnier et al. |
| 9,112,818 B1 | 8/2015 | Arad et al. |
| 9,148,368 B2 | 9/2015 | Armstrong et al. |
| 9,686,209 B1 | 6/2017 | Arad et al. |
| 9,755,932 B1 | 9/2017 | Godbole et al. |
| 9,961,022 B1 | 5/2018 | Kahn et al. |
| 10,044,646 B1 | 8/2018 | Detwiler |
| 2002/0136163 A1 | 9/2002 | Kawakami et al. |
| 2002/0141403 A1 | 10/2002 | Akahane et al. |
| 2002/0163917 A1* | 11/2002 | Chen ............. H04L 45/00 370/395.32 |
| 2003/0046414 A1 | 3/2003 | Pettyjohn et al. |
| 2003/0117958 A1 | 6/2003 | Nation et al. |
| 2004/0042477 A1 | 3/2004 | Bitar et al. |
| 2004/0066781 A1 | 4/2004 | Shankar et al. |
| 2004/0105384 A1 | 6/2004 | Gallezot et al. |
| 2004/0165588 A1 | 8/2004 | Pandya |
| 2004/0179476 A1* | 9/2004 | Kim ............. H04L 12/40143 370/230 |
| 2005/0005021 A1 | 1/2005 | Grant et al. |
| 2005/0013251 A1 | 1/2005 | Wang et al. |
| 2005/0078651 A1 | 4/2005 | Lee et al. |
| 2005/0243852 A1 | 11/2005 | Bitar et al. |
| 2006/0050690 A1 | 3/2006 | Epps et al. |
| 2006/0092837 A1* | 5/2006 | Kwan ............. H04L 47/10 370/229 |
| 2007/0008985 A1 | 1/2007 | Lakshmanamurthy et al. |
| 2007/0104102 A1 | 5/2007 | Opsasnick |
| 2007/0104211 A1 | 5/2007 | Opsasnick |
| 2007/0110090 A1 | 5/2007 | Musoll et al. |
| 2007/0183415 A1 | 8/2007 | Fischer et al. |
| 2007/0189169 A1 | 8/2007 | Wu et al. |
| 2007/0195761 A1 | 8/2007 | Tatar et al. |
| 2007/0195773 A1 | 8/2007 | Tatar et al. |
| 2007/0208876 A1 | 9/2007 | Davis |
| 2007/0230493 A1 | 10/2007 | Dravida et al. |
| 2007/0253438 A1 | 11/2007 | Curry et al. |
| 2007/0280277 A1* | 12/2007 | Lund ............. H04L 49/205 370/412 |
| 2008/0130670 A1 | 6/2008 | Kim et al. |
| 2008/0232251 A1* | 9/2008 | Hirayama ............. H04L 47/10 370/235 |
| 2009/0180475 A1 | 7/2009 | Hashimoto |
| 2010/0128735 A1 | 5/2010 | Lipschutz |
| 2010/0135158 A1 | 6/2010 | Adams |
| 2011/0261687 A1 | 10/2011 | Armstrong et al. |
| 2012/0236734 A1 | 9/2012 | Sampath et al. |
| 2013/0003556 A1 | 1/2013 | Boden et al. |
| 2013/0315054 A1 | 11/2013 | Shamis et al. |
| 2014/0112128 A1* | 4/2014 | Kwan ............. H04L 47/26 370/230 |
| 2014/0321473 A1 | 10/2014 | Chen et al. |
| 2014/0328180 A1 | 11/2014 | Kim et al. |
| 2014/0334489 A1 | 11/2014 | Bosshart et al. |
| 2014/0362698 A1 | 12/2014 | Arad |
| 2015/0016247 A1 | 1/2015 | Hayes et al. |
| 2015/0016266 A1 | 1/2015 | Dumitrescu et al. |
| 2015/0138976 A1 | 5/2015 | Lu et al. |
| 2015/0139235 A1 | 5/2015 | Lu et al. |
| 2015/0229575 A1* | 8/2015 | Bottorff ............. H04L 47/12 370/230 |
| 2016/0154756 A1 | 6/2016 | Dodson et al. |
| 2016/0173383 A1 | 6/2016 | Liu et al. |
| 2016/0330127 A1 | 11/2016 | Kim et al. |
| 2016/0344636 A1* | 11/2016 | Elias ............. H04L 47/2441 |
| 2017/0126588 A1 | 5/2017 | Anand et al. |
| 2017/0134282 A1 | 5/2017 | Agarwal et al. |
| 2017/0134283 A1 | 5/2017 | Iles et al. |
| 2017/0134310 A1 | 5/2017 | Koladi et al. |
| 2017/0222881 A1 | 8/2017 | Holbrook et al. |
| 2017/0251077 A1 | 8/2017 | Eerpini et al. |
| 2017/0264571 A1 | 9/2017 | Aibester et al. |
| 2017/0339075 A1 | 11/2017 | Arad |
| 2018/0006945 A1 | 1/2018 | Flajslik et al. |

OTHER PUBLICATIONS

Alizadeh, Mohammad, et al., "pFabric: Minimal Near-Optimal Datacenter Transport," SIGCOMM'13, Aug. 12-16, 2013, 12 pages, ACM, Hong Kong, China.

Bosshart, Patrick, et al., "Forwarding Metamorphosis: Fast Programmable Match-Action Processing in Hardware for SDN," SIGCOMM'13, Aug. 12-16, 2013, 12 pages, ACM, Hong Kong, China.

Alizadeh, Mohammad, et al., "CONGA: Distributed Congestion-Aware Load Balancing for Datacenters," SIGCOMM'14, Aug. 17-22, 2014, 12 pages, ACM, Chicago, IL, USA, Retrieved From: https://people.csail.mit.edu/alizadeh/papers/conga-sigcomm14.pdf.

Jeyakumar, Vimalkumar, et al., "Millions of Little Minions: Using Packets for Low Latency Network Programming and Visibility," SIGCOMM'14, Aug. 17-22, 2014, 12 pages, ACM, Chicago, IL, USA.

Sivaraman, Anirudh, et al., "Towards Programmable Packet Scheduling," HotNets '15, Nov. 16-17, 2015, 7 pages, ACM, Philadelphia, PA, USA.

Non-Published Commonly Owned U.S. Appl. No. 15/374,828, filed Dec. 9, 2016, 40 pages, Barefoot Networks, Inc.

Non-Published Commonly Owned U.S. Appl. No. 15/682,479, filed Aug. 21, 2017, 59 pages, Barefoot Networks, Inc.

Non-Published Commonly Owned U.S. Appl. No. 15/682,481, filed Aug. 21, 2017, 59 pages, Barefoot Networks, Inc.

Choudhury, Abhijit K., et al., "Dynamic Queue Length Thresholds for Shared-Memory Packet Switches," IEEE/ACM Transactions on Networking, Apr. 1998, 29 pages, vol. 6, No. 2.

Wadekar, Manoj, "Priority-based Flow Control and 802.3x," Institute of Electrical and Electronics Engineers, Inc., Feb. 11, 2008, 4 pages.

* cited by examiner

|  | priority 0 | priority 1 | priority 2 | priority 3 |
|---|---|---|---|---|
| pipeline 0 | 0.01 | 0.05 | 0.08 | 0.11 |
| pipeline 1 | 0.02 | 0.06 | 0.09 | 0.14 |
| pipeline 2 | 0.03 | 0.03 | 0.06 | 0.1 |
| pipeline 3 | 0.02 | 0.04 | 0.06 | 0.09 |

*Figure 4*

PRIORITY-BASED FLOW CONTROL

BACKGROUND

Buffers are commonly used in network forwarding elements as temporary storages for data. For instance, a network forwarding element might use buffers to store packet data, either after that data is initially received (before the data is processed) or before the data is sent back out over the network. Forwarding elements may also use buffers to store packet data at various intermediate stages in packet processing. As hardware forwarding elements with easily configurable packet processing pipelines emerge, it would be beneficial to have various aspects of the buffer usage be configurable as well.

SUMMARY

For a hardware forwarding element, some embodiments provide a temporary storage (e.g., a buffer) for storing packet data for packets that have been processed by an ingress pipeline of the forwarding element, before the packet is processed by an egress pipeline of the forwarding element. In some embodiments, each packet has a packet class (determined, e.g., by the ingress pipeline and a priority value assigned to the packet), and the forwarding element only adds the packet to the buffer if the buffer has enough of its remaining space allocated to the packet class. Some embodiments, either alternatively or conjunctively, apply different flow control thresholds to the buffer for flows with different priority values.

In some embodiments, the hardware forwarding element includes a set of configurable ingress pipelines, a traffic management unit, and a set of configurable egress pipelines. The traffic management unit of some embodiments receives packets processed by the ingress pipelines, determines an egress pipeline for each packet, and stores the packet data in a buffer (also referred to as an output buffer) before the egress pipeline processes the packet. When adding the packet data to the buffer, some embodiments add a reference (e.g., a pointer) to the packet data in the queue for the determined egress pipeline.

However, the traffic management unit only adds a received packet to the buffer if the buffer has space available for the packet data. Some embodiments determine a packet class for each packet, and calculate the available buffer space for a packet class. Only if the available space for the packet class is larger than the size of the packet does the traffic management unit add the packet to the buffer. To calculate the available buffer space for a particular packet class, the traffic management unit determines the total currently available buffer space, then multiplies this amount by a coefficient specific to the packet class.

In some embodiments, the coefficients are configured for each packet class by a network administrator, in the same manner as the ingress and egress pipelines are configured. The coefficients, in some embodiments are all values between 0 and 1, and the sum of these coefficients is less than or equal to 1 (ideally a number close to but less than 1). This ensures that packets of all classes will always have some amount of space left in the buffer, as the buffer fills up. For more important classes of packets (e.g., higher priority), the administrator can configure larger coefficients so that more space will be available for packets of those classes.

As mentioned, in some embodiments the packet class for a packet is determined by the ingress pipeline that processed a packet and the priority value assigned to the packet. The ingress pipeline, in some embodiments, corresponds to the port on which a packet was received (multiple ports may correspond to a single ingress pipeline in some such embodiments). The ingress pipeline assigns a priority value to each packet that it processes according to its administrator-configured match-action unit in some embodiments. For example, some embodiments assign priority values to packets based on the connection 5-tuple (source and destination IP address, source and destination transport layer port, transport protocol), or on other packet header values. The packet classes used by the traffic management unit in some embodiments are all of the possible (ingress pipeline, priority value) combinations. That is, the number of coefficients is the number of ingress pipelines on the forwarding element (e.g., 8, 16, 32, 64, 100, etc.) multiplied by the number of possible priority values (e.g., 2, 4, 8, 25, etc.).

The traffic management unit also uses priority-specific flow control to manage the packet buffer in some embodiments. In general, a forwarding element using flow control generates a flow control message when it reaches a certain level of congestion. This flow control message is sent to one or more network elements (e.g., forwarding elements, packet sources, etc.) that send packets to the forwarding element, instructing the network elements to pause sending packets to the forwarding element (either for a period of time, until a second restart message is received, etc.). The traffic management unit of some embodiments establishes different threshold levels in the buffer for packets with different priority values.

When the traffic management unit adds a packet to the buffer that causes the buffer usage to pass one of these thresholds associated with a particular priority value (irrespective of whether the packet being added has this particular priority or not), the traffic management unit generates a flow control message for network elements that send packets having this particular priority. This may be a single network element overall, a single network element per egress pipeline, or multiple network elements per egress pipeline in different embodiments, depending on how the priority assignment is configured for the egress pipelines.

The forwarding element sends the flow control message to the sending network element(s), requesting that they pause sending packets to the forwarding element. These flow control messages may request that the sender cease sending all packets, packets having the particular priority, or a specific flow or flows. If the ingress pipeline assigns the priority values, some embodiments use the mappings of flows to priority values to determine to which network elements the flow control message will be sent.

As additional packets are added to the buffer, its usage will pass additional thresholds, leading to the traffic management unit generating additional flow control messages. A single source network element may receive multiple flow control messages from the forwarding element if that network element sends packets with different priorities to the forwarding element. As additional thresholds are sent, only the higher priority packets should be received by the forwarding element (so long as the sources recognize and cooperate with the flow control message).

Unless all or most of the packets being sent to the forwarding element are of the higher priorities, the rate at which the forwarding element receives packets should decrease. If the buffer usage drops below the threshold for a particular priority (or below a separate, lower threshold for the particular priority, to avoid rapid fluctuations), the traffic management unit generates a message to the source network elements to resume sending packets for the particular priority.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 illustrates a table that provides an example of coefficients assigned for sixteen packet classes FIGS. 5-7 conceptually illustrate examples of packets received by a traffic manager with an output buffer, and the determinations as to whether to add these packets to the output buffer or not.

DETAILED DESCRIPTION

For a hardware forwarding element, some embodiments provide a temporary storage (e.g., a buffer) for storing packet data for packets that have been processed by an ingress pipeline of the forwarding element, before the packet is processed by an egress pipeline of the forwarding element. In some embodiments, each packet has a packet class (determined, e.g., by the ingress pipeline and a priority value assigned to the packet), and the forwarding element only adds the packet to the buffer if the buffer has enough of its remaining space allocated to the packet class. Some embodiments, either alternatively or conjunctively, apply different flow control thresholds to the buffer for flows with different priority values.

In some embodiments, the hardware forwarding element includes a set of configurable ingress pipelines, a traffic management unit, and a set of configurable egress pipelines. The traffic management unit of some embodiments receives packets processed by the ingress pipelines, determines an egress pipeline for each packet, and stores the packet data in a buffer (also referred to as an output buffer) before the egress pipeline processes the packet.

Figure 1:
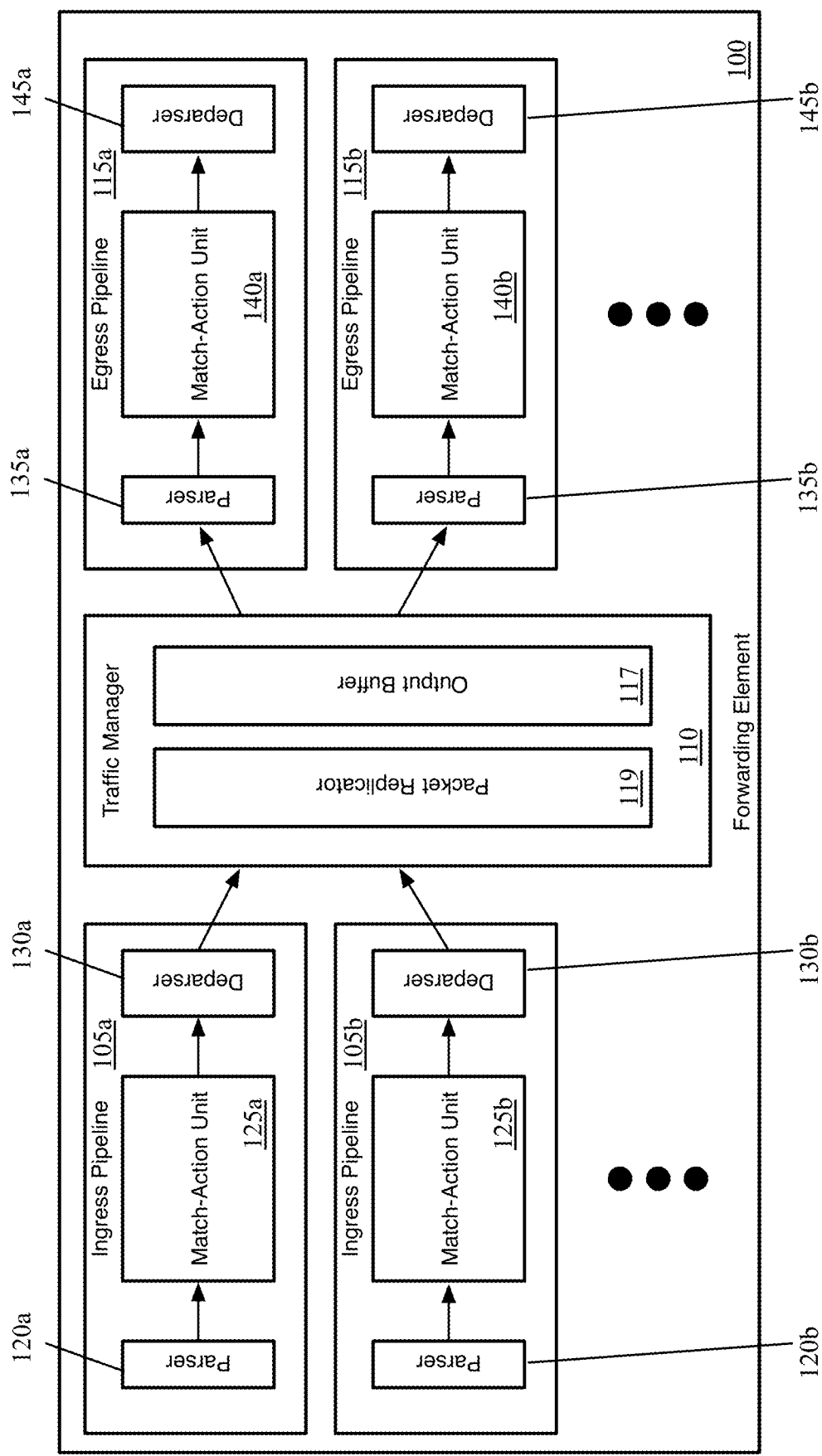
FIG. 1 conceptually illustrates the structure of the pipeline of a hardware forwarding element of some embodiments.

FIG. 1 conceptually illustrates the structure of the pipeline of such a hardware forwarding element of some embodiments. Specifically, FIG. 1 illustrates several ingress pipelines 105, a traffic management unit (referred to as a traffic manager) 110, and several egress pipelines 115. When the forwarding element 100 receives a packet, in some embodiments the packet is directed to one of the ingress pipelines 105 (each of which may correspond to one or more ports of the forwarding element). After passing through the selected ingress pipeline 105, the packet is sent to the traffic manager 110, where the packet enters a queue. The traffic manager 110 then dispatches the packet to one of the egress pipelines 115 (each of which may correspond to one or more ports of the forwarding element) via the output buffer 117. In some embodiments, there is no necessary correlation between which of the ingress pipelines 105 processes a packet and to which of the egress pipelines 115 the traffic manager 110 dispatches the packet. That is, a packet might be initially processed by ingress pipeline 105*b*, and then subsequently by egress pipeline 115*a*, etc.

Each ingress pipeline 105 includes a parser 120, a match-action unit (MAU) 125, and a deparser 130. Similarly, each egress pipeline 115 includes a parser 135, a MAU 140, and a deparser 145. The parser 120 or 135, in some embodiments, receives a packet as a formatted collection of bits in a particular order, and parses the packet into its constituent header fields according to a parse graph state machine. That is, the parser starts from the beginning of the packet and parses each header field in order, assigning these header fields to fields of a packet header vector for processing. Based on the values of certain fields (e.g., the Ethertype field of an Ethernet header, the Protocol field of an Internet Protocol header, etc.), the parser can determine the structure of the next set of header fields. In some embodiments, the parser 120 or 135 separates out the packet headers (up to a designated point) from the payload of the packet, and sends the payload directly to the deparser without going through the MAU processing (e.g., on a single wire).

The MAU 125 or 140 performs processing on the packet data (i.e., the packet header vector). In some embodiments, the MAU includes a sequence of stages, with each stage including one or more match tables and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the packet, which is then sent to the next stage of the MAU.

The deparser 130 or 145 reconstructs the packet using the packet header fields as modified by the MAU 125 or 140 and the payload received directly from the parser 120 or 135.

The deparser constructs a packet that can be sent out over the physical network, or to the traffic manager 110.

The traffic manager 110, as shown, includes a packet replicator 119 and the previously-mentioned output buffer 117. In some embodiments, the traffic manager 110 may include other components, such as a feedback generator for sending signals regarding output port failures, a flow control signal generator for sending a signal when the output buffer has reached a threshold, and additional components. The packet replicator 119 of some embodiments performs replication for broadcast/multicast packets, generating multiple packets to be added to the output buffer (e.g., to be distributed to different egress pipelines).

The output buffer 117 is part of a queuing and buffering system of the traffic manager in some embodiments. The traffic manager 110 provides a shared buffer that accommodates any queuing delays in the egress pipelines. In some embodiments, this shared output buffer 117 stores packet data, while references (e.g., pointers) to that packet data are kept in different queues for each egress pipeline 115. The egress pipelines request their respective data from the common data buffer using a configurable queuing policy. When a packet data reference reaches the head of its queue, the corresponding packet data is read out of the output buffer 117 and into the corresponding egress pipeline 115. In some embodiments, packet data may be referenced by multiple pipelines (e.g., for a multicast packet). In this case, the packet data is not removed from this output buffer 117 until all references to the packet data have cleared their respective queues.

This output buffer 117 may, as noted above, have its available space allocated between several different packet classes. In some embodiments, as the traffic manager 110 receives a packet, the traffic manager determines whether the available space in the buffer for that packet's class is large enough for the packet to be added to the buffer. Only if the available space for the packet class is larger than the size of the packet does the traffic manager 110 add the packet to the buffer 117. To calculate the available buffer space for a particular packet class, the traffic management unit determines the total currently available buffer space, then multiplies this amount by a coefficient specific to the packet class.

Figure 2:
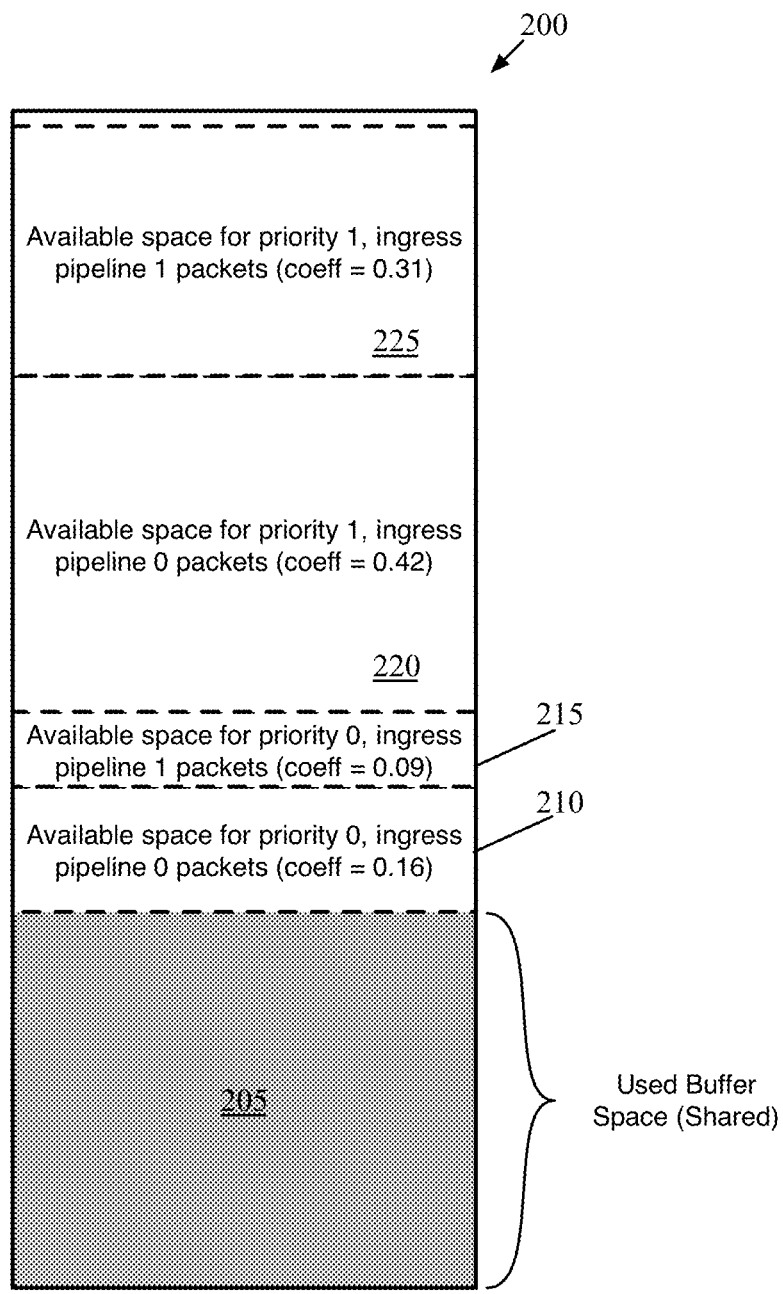
FIG. 2 conceptually illustrates an example of an output buffer that is partly filled, as well as the available space for different packet classes.

FIG. 2 conceptually illustrates an example of an output buffer 200 that is partly filled, as well as the available space for different packet classes. In some embodiments, the packet class for a packet is determined by the ingress pipeline that processed a packet and the priority value assigned to the packet. The ingress pipeline, in some embodiments, corresponds to the port on which a packet was received (multiple ports may correspond to a single ingress pipeline in some such embodiments). The ingress pipeline assigns a priority value to each packet that it processes according to its administrator-configured match-action unit in some embodiments. For example, some embodiments assign priority values to packets based on the connection 5-tuple (source and destination IP address, source and destination transport layer port, transport protocol), or on other packet header values. The packet classes used by the traffic manager in some embodiments are all of the possible combinations of (ingress pipeline, priority value). That is, the number of coefficients is the number of ingress pipelines on the forwarding element (e.g., 8, 16, 32, 64, 100, etc.) multiplied by the number of possible priority values (e.g., 2, 4, 8, 25, etc.). In the example of FIG. 2, for simplicity, the forwarding element only has two ingress pipelines and only assigns priority values of 0 or 1. As such, this forwarding element has four packet classes: ingress pipeline 0 and priority 0 (0,0), ingress pipeline 0 and priority 1 (0,1), ingress pipeline 1 and priority 0 (1,0), and ingress pipeline 1 and priority 1 (1,1).

As shown, a portion 205 of the output buffer 200 is storing packet data for packets in the egress pipeline queues. The remaining unused portion of the buffer 200 is conceptually divided into four portions 210-225 of different size based on coefficients assigned to the four possible packet classes. In some embodiments, the coefficients are configured for each packet class by a network administrator, in the same manner that the ingress and egress pipelines are configured. The coefficients, in some embodiments are all values between 0 and 1, and the sum of these coefficients is less than or equal to 1 (ideally a number close to but less than 1). This ensures that packets of all classes will always have some amount of space left in the output buffer, even as the buffer fills up.

For more important classes of packets (e.g., higher priority), the administrator can configure larger coefficients so that more space will be available for packets of those classes. In this example, the packet class (0,0) is assigned the coefficient 0.16 and the packet class (1, 0) is assigned coefficient 0.09. The higher priority packet classes (0,1) and (1,1) are assigned coefficients 0.42 and 0.31 respectively. Thus, if the remaining space in the output buffer was 100 Mb, the available space for each packet class would be 16 MB for class (0,0), 9 MB for class (1,0), 42 MB for class (0,1), and 31 MB for class (1,1).

Some embodiments recalculate the available space for each packet class on every clock cycle of the forwarding element processor (e.g., an arithmetic logic unit (ALU) performs this calculation). In this manner, the receipt of a packet for a particular packet class does not count entirely against the available space for that packet class. Instead, in the next clock cycle after the packet data has been added to the buffer, the available space is lessened by the size of the packet (assuming no packet data has been read out of the buffer in this time), and the new available space for each packet class is recalculated. Therefore, a sudden flood of packets for a specific class will not completely fill up that class, as the amount available will always be non-zero.

It should be noted that the output buffer 200, and similar representations in subsequent figures, represents a single global output buffer and its overall usage. The output buffer of some embodiments is divided into multiple slices that can be dynamically assigned to different egress pipelines and/or shared between egress pipelines.

Figure 3:
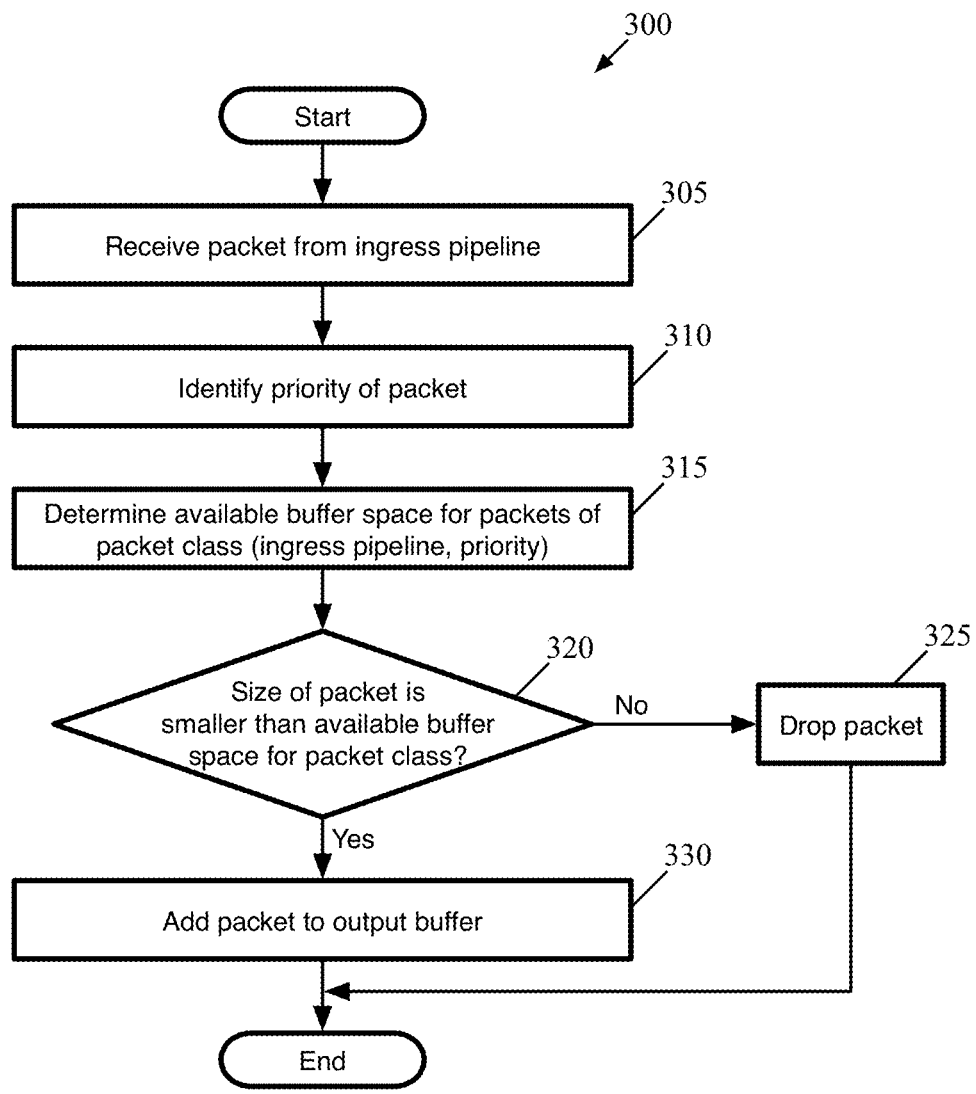
FIG. 3 conceptually illustrates a process of some embodiments for determining whether to add a packet to the output buffer of a forwarding element.

FIG. 3 conceptually illustrates a process 300 of some embodiments for determining whether to add a packet to the output buffer of a hardware forwarding element. The process 300 is described as performed by a traffic manager that operates between configurable ingress and egress pipelines of such a forwarding element. The traffic manager may include multiple physical components, such as buffers, arithmetic logic units, memories, etc., that collectively perform the described operations. However, it should be understood that, in some embodiments, similar processes for adding packets to buffers may be performed for other types of buffers in other types of forwarding elements. The process 300 will be described in part by reference to FIGS. 4-7, which illustrate examples of different priority packets from different ingress pipelines being received by a traffic manager and either added to the traffic manager's output buffer or dropped, depending on the packet class and the space available in the output buffer.

As shown, the process 300 begins by receiving (at 305) a packet from an ingress pipeline. As mentioned, the forwarding element of some embodiments may include multiple ingress pipelines (e.g., 4 pipelines, 8 pipelines, 32 pipelines, etc.), which each correspond to one or more physical ports of the forwarding element. This packet will have been processed by the match-action unit of the ingress pipeline, which performs various operations on the packet according to the packet header values of the packet and the match-action unit configuration.

The process 300 also identifies (at 310) the priority of the packet. In some embodiments, the priority value is assigned by the ingress pipeline according to its match-action unit processing. The ingress pipeline may assign priority values based on the source of the packet (e.g., source address, port on which the packet was received, network element from which the packet was received, etc.), the connection 5-tuple (i.e., source and destination IP addresses, source and destination transport layer port numbers, transport layer protocol), quality of service or other priority-related information in the packet header, etc. Different embodiments will have different numbers of possible priority values—4 (values 0-3), 8 (values 0-7), etc. The deparser of the ingress pipeline may encode this information within the packet headers in some embodiments, so that the traffic manager can read the priority value from the packet. In other embodiments, the priority is passed along with the packet but not as part of the packet header.

With the ingress pipeline and priority value known, the process 300 determines (at 315) the available buffer space for packets of the packet class defined by these two values (i.e., the packet class (ingress pipeline, priority)). In some embodiments, the traffic manager calculates the available buffer space for each possible packet class every clock cycle. These calculations are based on the total available buffer space (i.e., the total size of the buffer minus the currently used buffer space) and coefficients configured for each of the packet classes. In some embodiments, the coefficients are configured for each packet class by a network administrator, in the same manner as the ingress and egress pipelines are configured. The coefficients, in some embodiments are all values between 0 and 1, and the sum of these coefficients is less than or equal to 1 (ideally a number close to but less than 1).

FIG. 4 illustrates a table 400 that provides an example of coefficients assigned for sixteen packet classes. In this case, the example forwarding element has four ingress pipelines (pipelines 0-3) and assigns packets to a range of four priority values (0-3). Other embodiments may have more ingress pipelines and/or use more priority values; however, for simplicity, only sixteen packet classes are shown in this example. As seen, the coefficients range from 0.01 for packet class (0,0) to 0.14 for packet class (1,3). The coefficients effectively represent a percentage of the overall available buffer space that is allocated for the packet class at any given time. Thus, irrespective of how much of the buffer has been used, 10% of the available space is allocated to packets from ingress pipeline 2 with a priority value of 3, 5% of the available space is allocated to packets from ingress pipeline 0 with priority value 1, etc. This ensures that packets of all classes will always have some amount of space left in the buffer, even as the buffer fills up.

Although in this example, the coefficients generally increase from lower priority to higher priority, this is not a requirement. The administrator can configure larger coefficients for higher priorities so that more space will be available for packets of those classes. However, if larger amounts of packets are expected for lower priorities, these can be configured with larger coefficients instead. In addition, different coefficients may be assigned to different ingress pipelines, even for packets with the same priority. If a particular ingress pipeline is expected to be handling more packets or packets of higher relative importance to the other pipelines, the administrator may configure larger coefficients for the packet classes of this pipeline.

Next, the process 300 determines (at 320) whether the size of the packet is smaller than the available buffer space for the packet class. Each packet received by the traffic manager of the forwarding element has a size, which is the amount of space that the packet would occupy in the buffer. In order for the packet to be added to the output buffer, some embodiments require that the packet size be smaller than the available space for the packet's class, as determined by the coefficient for the packet class. Thus, the larger the coefficient, the likelier that the packet will be smaller than the available buffer space. With regard to the example shown in the table 400, if 100 MB are available in the buffer, then only 1 MB is allocated to the packet class (0,0), while 10 MB are allocated to the packet class (2,3).

If the packet size is larger than the space available for its packet class, then the process 300 drops (at 325) the packet. That is, the traffic manager drops the packet when the overall available buffer space is small enough that the network administrator has determined (via the coefficient assignment) that the remaining buffer space should be conserved for packet classes deemed more important. In some embodiments, this decision is made irrespective of what packet classes are already in the buffer. That is, even if the coefficient for a particular packet class is 0.1, packets from that class could occupy more than 10% of the overall buffer space. If only packets belonging to that particular packet class have been received, then once that packet class occupies 10% of the buffer, it would still be allocated 10% of the remaining 90%, or 9% more of the overall buffer.

On the other hand, if the packet size is smaller than the available buffer space allocated to the packet class, the process adds (at 330) the packet to the buffer. After either adding the packet to the buffer or dropping the packet, the process 300 ends, although the process is repeated for each packet processed by the ingress pipeline and sent to the traffic manager. In some embodiments, adding the packet to the packet buffer involves writing the packet data into the buffer while also adding the packet to an egress pipeline queue. The egress pipeline queue references the packet data (e.g., with a pointer or other construct). When the packet reaches the head of the queue, the egress pipeline reads the packet data out of the buffer, freeing up buffer space.

Figure 5:
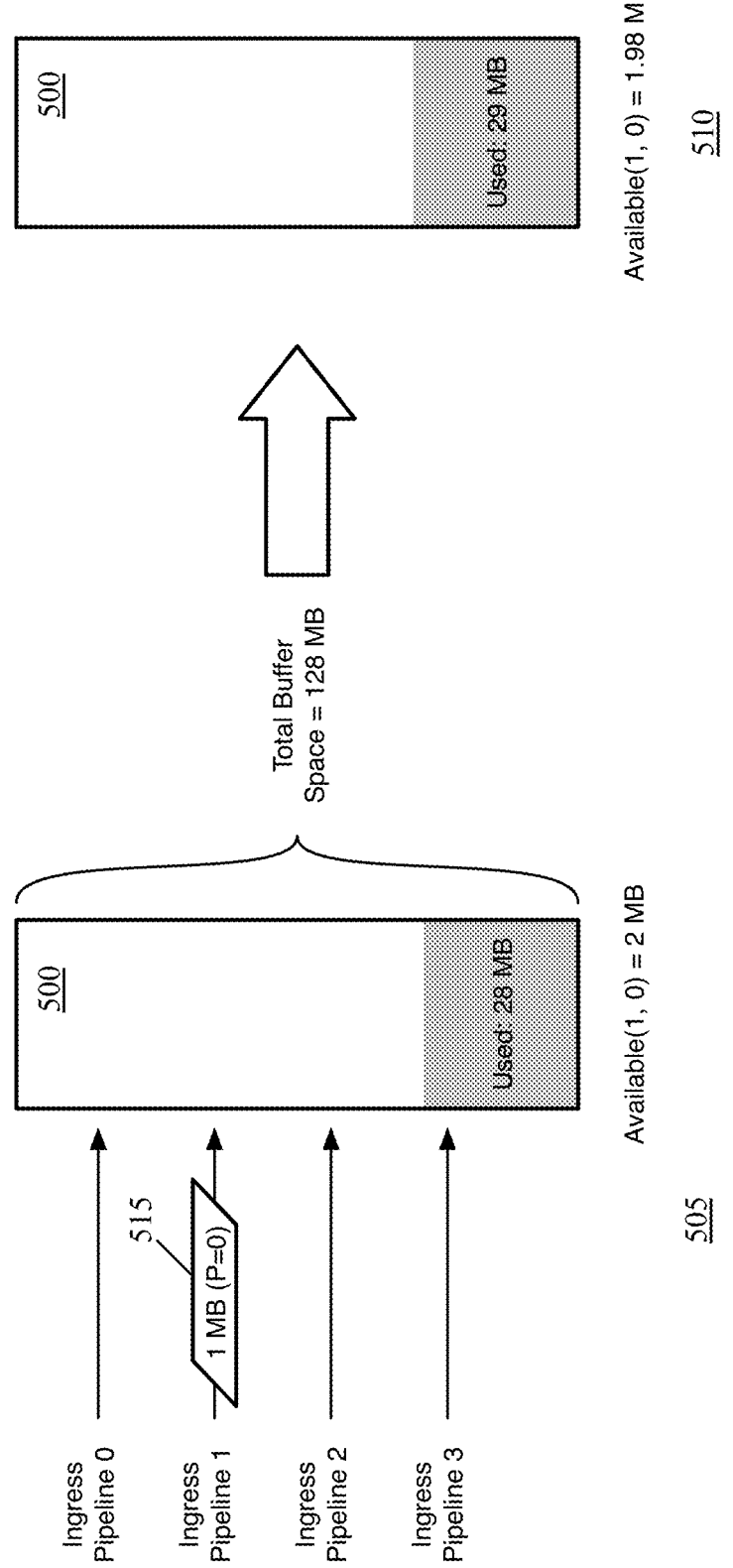
Figure 6:
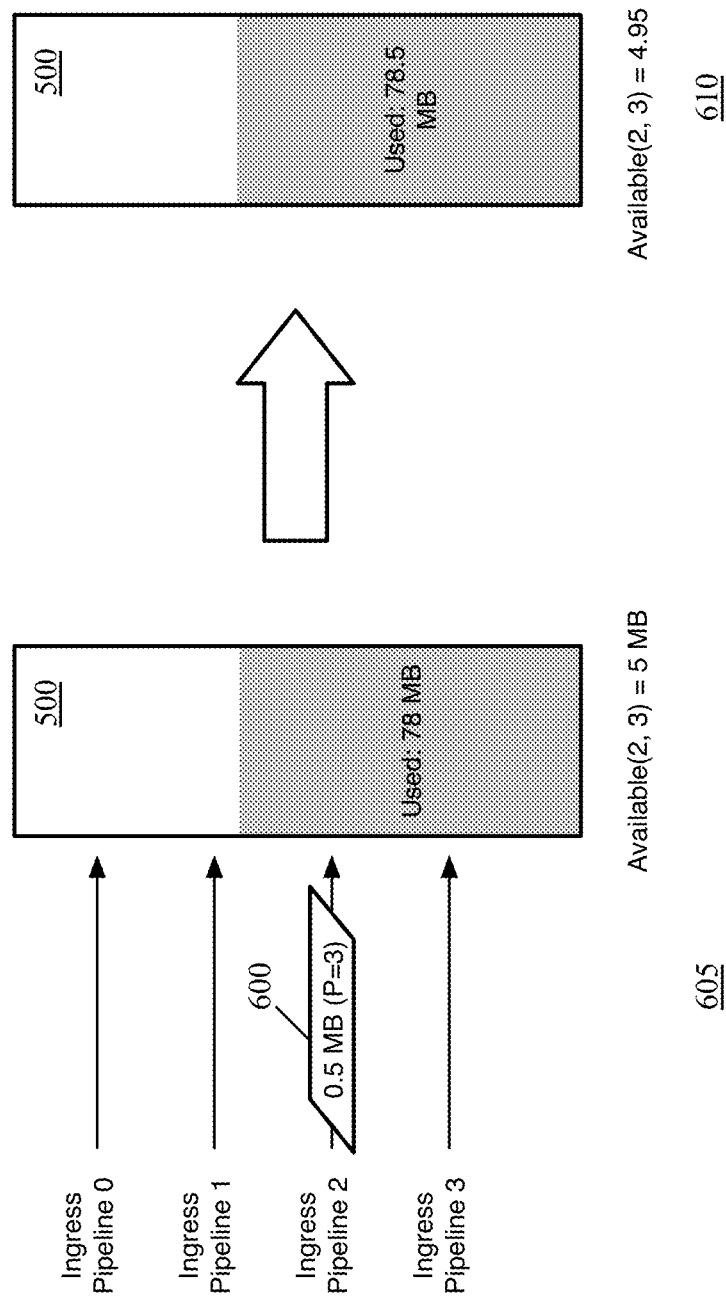
Figure 7:
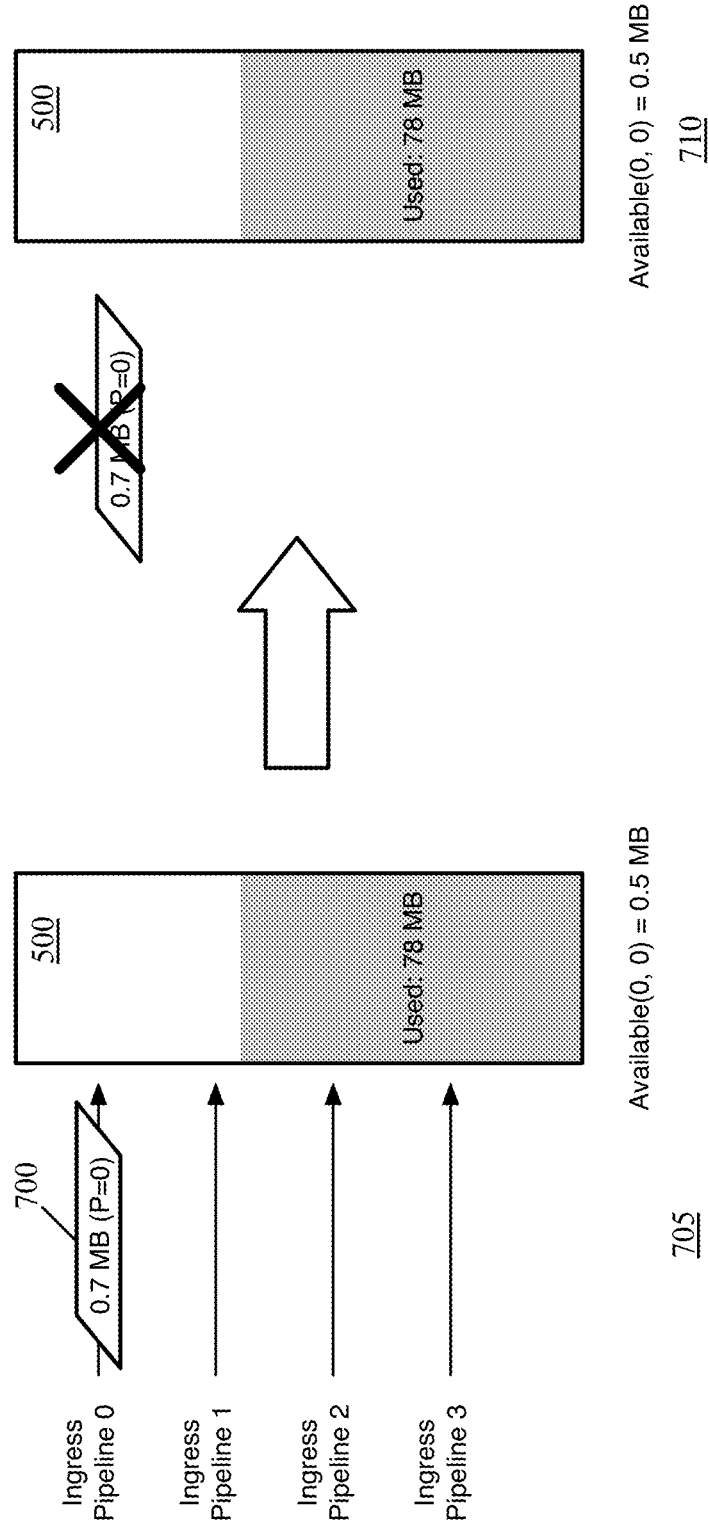

FIGS. 5-7 conceptually illustrate examples of packets received by a traffic manager with an output buffer 500, and the determinations as to whether to add these packets to the output buffer 500 or not. These examples use the packet class coefficients shown in the table 400 of FIG. 4. FIG. 5 illustrates the output buffer 500 over two stages 505-510 in which the traffic manager receives a packet 515 from ingress pipeline 1. As shown in this figure, the overall size of the output buffer 500 in this example is 128 MB; this is used as an example for simplicity, as the output buffer of actual forwarding elements could be smaller or larger in different embodiments.

In the first stage 505, the traffic manager receives a packet 515 from ingress pipeline 1. This packet 515 has a size of 1 MB and has been assigned a priority value of 0 by the ingress pipeline match-action unit. At this point, 28 MB of the 128 MB buffer 500 currently stores packet data, so the total available space in the buffer is 100 MB. Using the coefficient value of 0.02 for the packet class (1,0) from the table 400, this stage also shows that the space available for this packet class is currently 2 MB.

In the second stage 510, the packet data for packet 515 has been added to the output buffer 500 because the packet size (1 MB) is less than the available space for its packet class (2 MB). In this example (and the subsequent examples), no packets have been read out of the buffer between the two stages 505 and 510. As such, the buffer usage is now 29 MB, and the total available space is 99 MB. Therefore, because the traffic manager recalculates the available space for each packet class regularly (e.g., every clock cycle), the space available for the packet class (1,0) is now 1.98 MB. That is, the 1 MB of data from packet 515 does not count specifically against its packet class, but instead just against the total available space from which the packet class availability amounts are derived.

FIG. 6 illustrates the output buffer 500 over two stages 605-610 in which the traffic manager receives a packet 600 from ingress pipeline 2. As shown in the first stage 605, the packet 600 has a size of 0.5 MB and has been assigned a priority value of 3 by the ingress pipeline match-action unit. At this point, 78 MB of the 128 MB buffer 500 currently stores packet data, so the total available space in the buffer is 50 MB. Using the coefficient value of 0.1 for the packet class (2,3) from the table 400, this stage also shows that the space available for this packet class is currently 5 MB.

In the second stage 610, the packet data for packet 600 has been added to the output buffer 500 because the packet size (0.5 MB) is less than the available space for its packet class (5 MB). As such, the buffer usage is now 78.5 MB, and the total available space is 49.5 MB. Therefore, because the traffic manager recalculates the available space for each packet class regularly, the space available for the packet class (2,3) is now 4.95 MB.

FIG. 7 illustrates the traffic manager receiving a packet that is not added to the output buffer 500 because the packet is larger than the space available for its packet class. This figure illustrates the output buffer 500 over two stages 705-710 in which the traffic manager receives a packet 700 from ingress pipeline 0. As shown in the first stage 705, the packet 700 has a size of 0.7 MB and has been assigned a priority value of 0 by the ingress pipeline match-action unit. At this point, as in the previous figure, 78 MB of the 128 MB buffer 500 currently stores packet data, so the total available space in the buffer is 50 MB. Using the coefficient value of 0.01 for the packet class (0,0) from the table 400, this stage also shows that the space available for this packet class is currently 0.5 MB.

In the second stage 710, the traffic manager drops the packet 700 because the packet size (0.7 MB) is larger than the available space for its packet class (0.5 MB) and thus the packet 700 is not stored in the packet buffer or added to an egress pipeline queue. As such, the buffer usage, free space, and available space for each packet class stays the same in the second stage 710 (as in the above cases, assuming no packets are read from the buffer to an egress pipeline during this time).

FIGS. 6 and 7 illustrate the buffer 500 at the same level of usage, but with different results for different packet classes owing to large differences in the coefficients for these packet classes (and therefore large differences in the available space for the packet classes). In FIG. 7, even though the buffer still has a lot of space available (50 MB), the priority 0 packet has been deemed not important enough to store. As the buffer fills up, the less important (typically lower priority) packets will be dropped first, thereby saving the space for more important (typically higher priority) packets.

In addition, some embodiments attempt to get the other network elements (e.g., forwarding elements, packet sources such as physical or virtual machines, etc.) to stop sending lower priority packets as the buffer fills up, so that the traffic manager does not need to drop these packets. Specifically, some embodiments use priority-based flow control with different thresholds for different priority values in order to get different packet senders to stop sending lower priority packets at different times.

In general, a forwarding element using flow control generates a flow control message when it reaches a certain level of congestion. This flow control message is sent to one or more network elements (e.g., forwarding elements, packet sources, etc.) that send packets to the forwarding element, instructing these network elements to pause sending packets to the forwarding element (either for a period of time, until a second restart message is received, etc.). The traffic manager of some embodiments establishes different threshold levels in the buffer for packets with different priority values.

Figure 8:
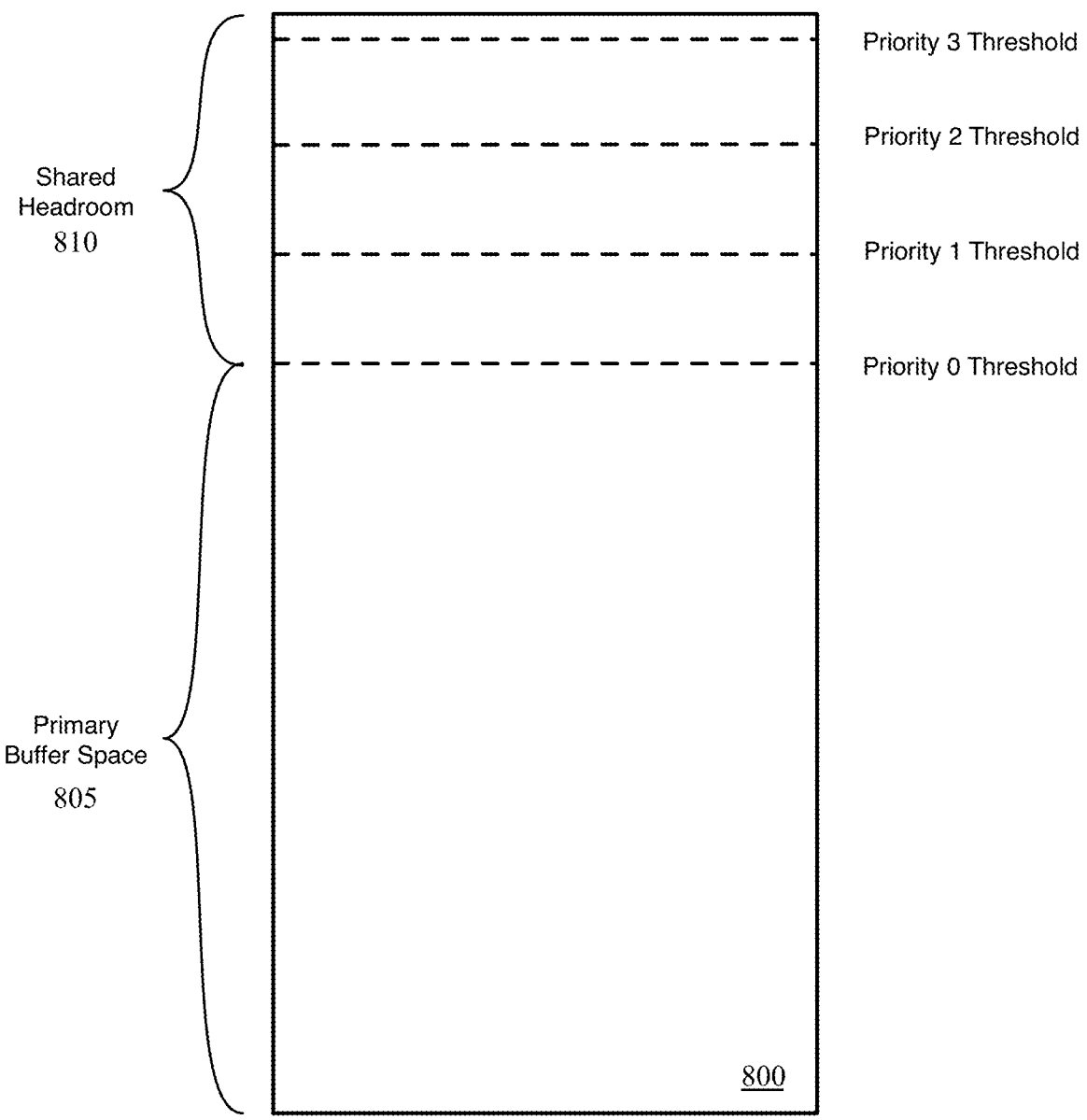
FIG. 8 conceptually illustrates an output buffer of some embodiments with different flow control thresholds for packets of different priorities.

FIG. 8 conceptually illustrates an output buffer 800 of some embodiments with different flow control thresholds for packets of different priorities. The output buffer 800 includes a primary buffer space 805 and a shared headroom 810. The primary buffer space 805 represents the portion of the buffer that may be used before the forwarding element initiates any level of flow control, while the shared headroom 810 represents additional space in the buffer for received packets that may store packet data for the egress pipeline queues, even after flow control has been initiated.

The illustration of the buffer 800 also shows thresholds for different priority values, which indicate when the traffic manager will initiate priority-specific flow control for the different priorities. In this case, the forwarding element uses four possible priority values (0-3), though as noted above, other embodiments may use fewer or more possible priorities. The thresholds, in some embodiments, are configured by a network administrator, in the same manner as the match-action units of the ingress/egress pipelines or the buffer availability coefficients described above. In this case, the different thresholds are evenly spaced throughout the headroom (with the threshold for the highest priority packets near the full buffer capacity), but in other embodiments thresholds may be spaced differently. For instance, in some embodiments the administrator may want to stop receiving the lowest several priorities very early, but wait until significantly more of the buffer has been used before sending flow control messages for the other priorities. In addition, the administrator could choose to not use flow control for some of the priority values (e.g., packets of the highest priority or priorities).

When the traffic manager adds a packet to the buffer 800 that causes the buffer usage to pass one of these thresholds associated with a particular priority value (irrespective of whether the packet being added has this particular priority or not), the traffic manager of some embodiments generates a flow control message for network elements that send packets having this particular priority. In other embodiments, the traffic manager generates a signal that causes separate components of the forwarding element to generate flow control messages.

Figure 9:
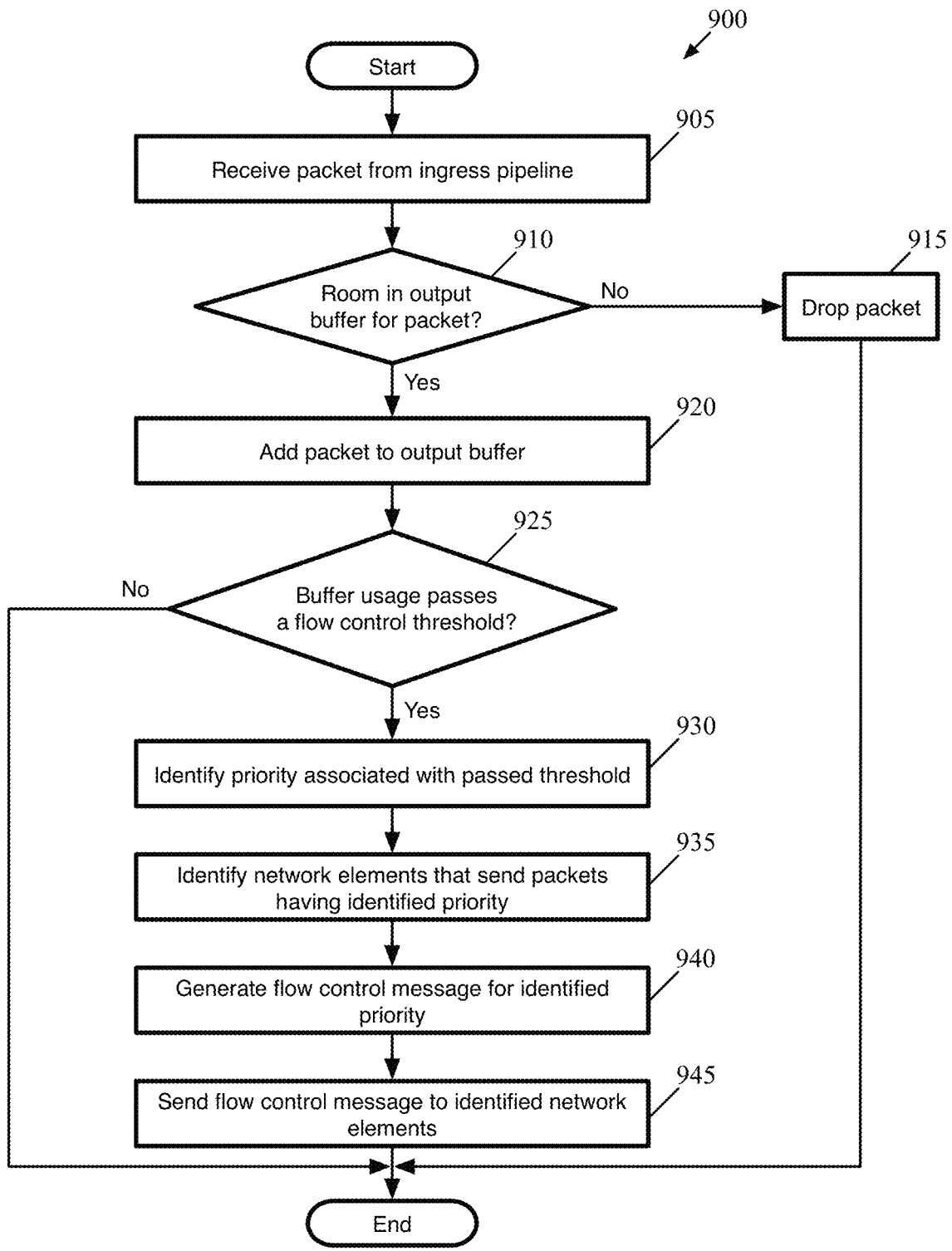
FIG. 9 conceptually illustrates a process of some embodiments for adding packets to an output buffer of a hardware forwarding element and determining whether to send flow control messages.

FIG. 9 conceptually illustrates a process 900 of some embodiments for adding packets to an output buffer of a hardware forwarding element and determining whether to send flow control messages. The process 900 is described as performed by a traffic manager that operates between configurable ingress and egress pipelines of such a forwarding element. The traffic manager may include multiple physical components, such as buffers, arithmetic logic units, memories, etc. that collectively perform the described operations. However, it should be understood that, in some embodiments, similar processes for adding packets to buffers may be performed for other types of buffers in other types of forwarding elements. The process 900 will be described in part by reference to FIGS. 10 and 11, which illustrate examples of packets being added to an output buffer and causing the generation of flow control messages.

As shown, the process 900 begins by receiving (at 905) a packet from an ingress pipeline. As mentioned, the forwarding element of some embodiments may include multiple ingress pipelines (e.g., 4 pipelines, 8 pipelines, 32 pipelines, etc.), which each correspond to one or more physical ports of the forwarding element. This packet will have been processed by the match-action unit of the ingress pipeline, which performs various operations on the packet according to the packet header values of the packet and the match-action unit configuration.

The process determines (at 910) whether there is space available in the output buffer for the packet. In some embodiments, this is a simple determination as to whether the overall available space in the output buffer is larger than the size of the packet. Other embodiments may use a process such as that described above by reference to FIG. 3, that assigns each packet to a packet class (e.g., based on its ingress pipeline and priority value) and determines whether the available space for packets of that packet class is large enough to store the received packet. When the output buffer does not have enough space available for the packet, the process drops (at 915) the packet, and ends.

However, when the output buffer does have space available, the process adds (at 920) the packet to the output buffer. In some embodiments, the traffic manager writes the packet data to a particular slice of the buffer associated with a particular egress pipeline or pipelines. Other embodiments use a single buffer construct that is shared between all of the egress pipelines. In addition, the traffic manager adds the packet to the queue for one of the egress pipelines (or, in some embodiments, multiple egress pipelines for broadcast/multicast packets). Rather than storing the packet data in the queue, a reference to the data in the output buffer is added to the queue by the traffic manager.

Unless packet data is also read out from the output buffer by one or more egress pipelines, adding the packet to the buffer will increase the usage of the output buffer (and therefore decrease the available space in the buffer). As such, the process determines (at 925) whether the buffer usage passes a flow control threshold as a result of adding the packet to the buffer. As described above, the output buffer of some embodiments has different flow control thresholds for different priority values in terms of its overall output. When the overall buffer capacity passes one of these flow control thresholds associated with a particular priority, the traffic manager initiates flow control with respect to that priority, in order to notify other network elements to cease sending packets of the particular priority to the forwarding element.

If adding the packet to the buffer does not result in a flow control threshold being passed, the process 900 ends. In general, this will be the case for most packets, unless the buffer is very small relative to the typical packet size. However, when adding the packet to the buffer results in the overall buffer usage passing a flow control threshold, the process 900 identifies (at 930) the priority value associated with the passed threshold.

The process also identifies (at 935) the network element or network elements that send packets having this identified priority. The hardware forwarding element of some embodiments may have multiple ports that connect directly to multiple other network elements (i.e., as previous or next hops), such as other forwarding elements (e.g., hardware or software switches/routers), middleboxes (e.g., firewalls, etc. that operate separate from routers), end machines (e.g., physical client or server computers, virtual machines, etc.) that operate as sources and/or destinations for data traffic, etc.

Some embodiments assign priority values such that all of the traffic from a particular network element has a single priority value, and/or that a single network element corresponds to a particular priority value. In other embodiments, the ingress pipelines assign a single priority value to packets from one (out of potentially many) network elements per ingress pipeline. Other embodiments assign the priority values independently of the network element from which a packet was sent, instead using other factors (e.g., source addresses, destination addresses, connection 5-tuple, etc.). In such case, packets having the identified priority value may be sent to the forwarding element from multiple network elements, and each network element may send packets to the forwarding element that are assigned multiple different priority values by the ingress pipelines of the forwarding element.

The process 900 then generates (at 940) flow control messages for the identified priority value, and sends (at 945) the flow control messages to the identified network elements. The process then ends. If the priority values are assigned such that all packets from a given network element are assigned the same priority value, then the flow control message can simply instruct the sender to stop sending packets generally. If a network element sends packets that are assigned multiple different priorities, then the flow control message instructs the sender to stop sending packets having the specified priority. This may require specifying other indicators that the ingress pipeline(s) use to assign priority, such as the 5-tuples of packets that are assigned to the particular priority.

The flow control messages may request that the sender cease sending the specified packets for a particular period of time, or until a message notifying the sender to resume is sent. In the latter case, each threshold has a corresponding buffer usage level at which the message to resume is sent. This amount may be the same as the threshold for sending the initial flow control message in some embodiments. However, other embodiments use a separate (e.g., lower) buffer usage level so as to avoid having the buffer usage rapidly fluctuate between slightly below and slightly above the threshold, leading to the forwarding element repeatedly sending pause and resume messages.

This process describes the traffic manager as determining when the output buffer passes a threshold and generating the flow control message. In other embodiments, additional components of the hardware forwarding element are involved in this process. For instance, a packet generation component may be used to generate the actual pause messages. In some such embodiments, the traffic manager generates a signal that specifies the priority of the threshold that was passed and the need for a pause message, and this separate component generates the actual message and sends the message out via one or more egress pipelines. In yet other embodiments, the egress pipelines themselves generate the requisite flow control messages based on a signal from the traffic manager.

Unless all or most of the packets being sent to the forwarding element are of the higher priorities (or unless the network elements to which flow control messages are sent ignore those messages), the rate at which the forwarding element receives packets should decrease as flow control is initiated for the lower priorities. However, as additional packets are added to the buffer, the buffer usage will continue to pass additional thresholds (unless the rate at which packets are read out of the buffer surpasses the rate at which they are received), leading to the traffic manager generating additional flow control messages for these higher priorities. While the process 900 is described for a packet that causes the output buffer usage to pass only a single threshold, an administrator could configure the forwarding element to have multiple thresholds close enough together that a single packet causes the usage to pass both thresholds at once. In this case, the traffic manager would generate multiple messages that might be sent to different sets of network elements.

Figure 10:
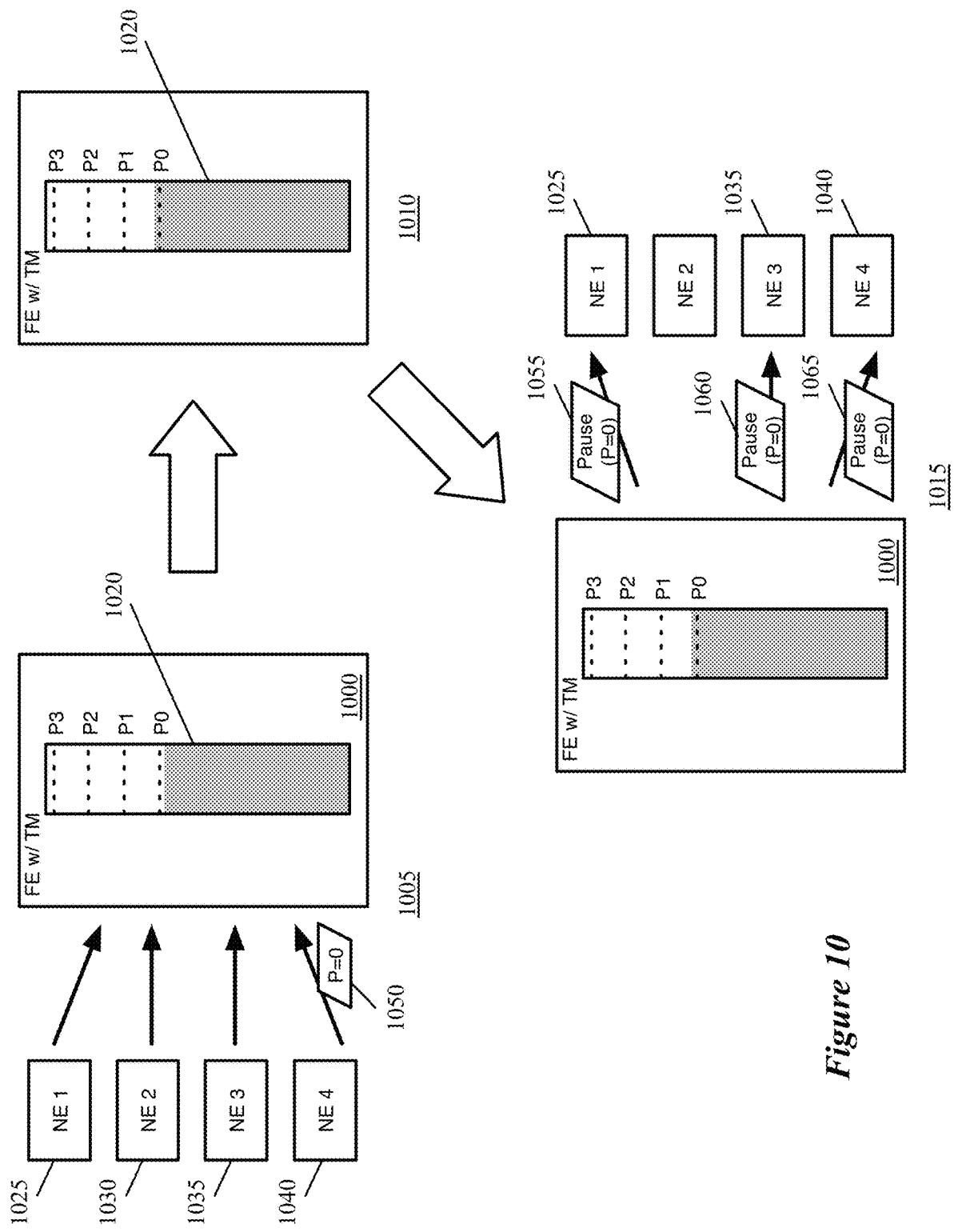
FIGS. 10 and 11 conceptually illustrate examples of incoming packets resulting in a flow control threshold of an output buffer being passed.
Figure 11:
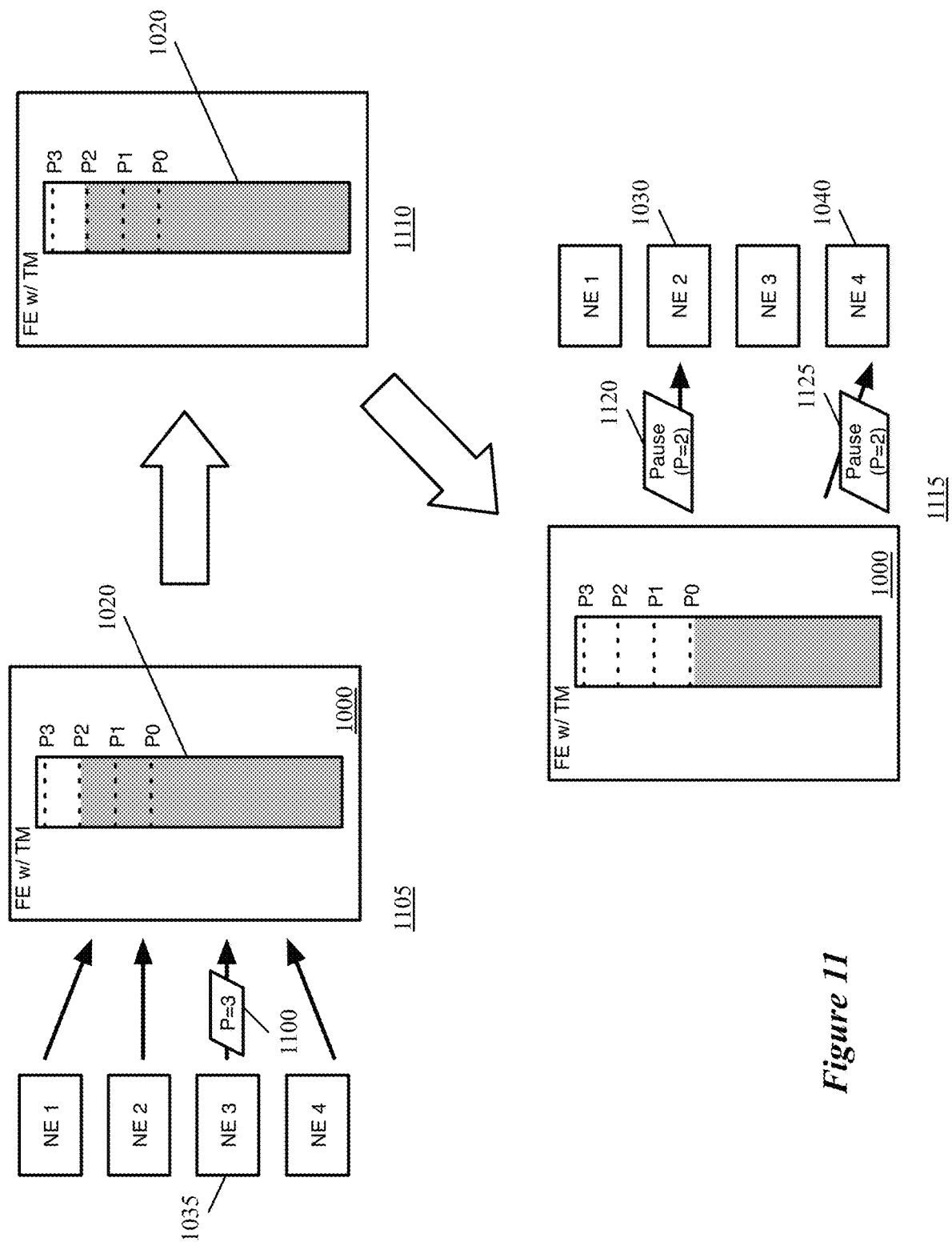

FIGS. 10 and 11 conceptually illustrate examples of incoming packets resulting in a flow control threshold of an output buffer being passed. FIG. 10 illustrates a forwarding element 1000 with an output buffer 1020 over three stages 1005-1015. The forwarding element 1000 includes ingress and egress pipelines as well as traffic manager circuitry in some embodiments, which are not shown here for the sake of simplicity. The figure also shows four network elements 1025-1040 that send packets to (and receive packets from) the forwarding element 1000. These network elements 1025-1040 may be other forwarding elements (e.g., switches, routers), packet sources or destinations such as physical computers, etc. The network elements send packets to four different ports of the forwarding element 1000 in some embodiments. These four different ports may correspond to four different egress pipelines, may all correspond to one egress pipeline, or may correspond to two or three egress pipelines with some overlap between the network elements. In the example, the network elements may send packets with any priority, though not all of the network elements actually send packets having all possible priority values.

The buffer 1020, as shown, includes separate flow control thresholds for priority values 0-3 (in this example, as in the previous examples, the forwarding element 1000 uses four possible priority values). In the first stage 1005, the portion of the buffer currently storing packet data is nearly up to the first (priority 0) threshold. At this stage, the network element 1040 sends a packet 1050 to the forwarding element 1000. This packet 1050 has a priority value of 0.

In the second stage 1010, the traffic manager of the forwarding element 1000 determines that space is available in the output buffer for the packet 1050 and adds the packet data to the output buffer 1020. As a result, the second stage 1010 illustrates that the buffer 1020 is now filled past the priority 0 flow control threshold.

This causes the traffic manager to initiate priority-based flow control for priority 0 packets. As a result, in the third stage 1015, the forwarding element 1000 generates a flow control message requesting that the recipient cease (at least temporarily) sending packets with priority 0. If the priority values are assigned internally by the ingress pipelines of the forwarding element 1000, these flow control messages may indicate a specific flow or flows for each network element to cease sending to the forwarding element 1000. As mentioned, the flow control messages may be generated by the traffic manager, the egress pipeline(s), or a separate packet generation component in different embodiments. In this case, three of the network elements 1025, 1035, and 1040 send priority 0 packets to the forwarding element, and therefore flow control messages 1055-1065 are sent to these three network elements. As the second network element 1030 does not send packets that are assigned a priority value of 0, this network element does not receive a flow control message at this time.

FIG. 11 illustrates the forwarding element 1000 over three stages 1105-1115 in which a packet is added to the output buffer causing the buffer to pass a different flow control threshold. In the first stage 1105, the portion of the buffer 1020 currently storing packet data is nearly up to the third (priority 2) threshold. At this stage, the network element 1035 sends a packet 1100 to the forwarding element 1000. This packet has a priority value of 3.

In the second stage 1110, the traffic manager of the forwarding element 1000 determines that space is available in the output buffer for the packet 1100 and adds the packet data to the output buffer 1020. As a result, the second stage 1110 illustrates that the buffer 1020 is now filled past the priority 2 flow control threshold. In this example, the packet was a priority 3 packet that cause the buffer usage to pass the priority 2 threshold. In general, the packets filling the buffer and causing the buffer usage to pass a particular flow control threshold do not need to be of the priority value associated with the particular flow control threshold. In fact, if a particular network element did not pause its sending of priority 0 or priority 1 packets in response to those flow control messages, then a lower priority packet could result in the output buffer passing the priority 2 threshold.

The usage of the output buffer 1020 passing the priority 2 flow control threshold causes the traffic manager to initiate priority-based flow control for priority 2 packets. As a result, in the third stage 1115, the forwarding element 1000 generates a flow control message requesting that the recipient cease (at least temporarily) sending packets with priority 2. If the priority values are assigned internally by the ingress pipelines of the forwarding element 1000, these flow control messages may indicate a specific flow or flows for each network element to cease sending to the forwarding element 1000. As mentioned, the flow control messages may be generated by the traffic manager, the egress pipeline(s), or a separate packet generation component in different embodiments. In this case, two of the network elements 1030 and 1040 send priority 2 packets to the forwarding element, and therefore flow control messages 1120 and 1125 are sent to these two network elements. As the other two network elements 1025 and 1035 do not send packets that are assigned a priority value of 2, they do not receive a flow control message at this time.

The process 900 of FIG. 9 and the subsequent examples show flow control on a per-priority basis. However, other embodiments could use thresholds that are per-priority and per-ingress pipeline, like the buffer availability coefficients described above. That is, rather than a single threshold for each priority value, some embodiments have different thresholds for each (ingress pipeline, priority value) packet class. In addition, some embodiments track the amount of packet data stored in the output buffer for each packet class, and initiate flow control for the packet class when this amount passes a threshold.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
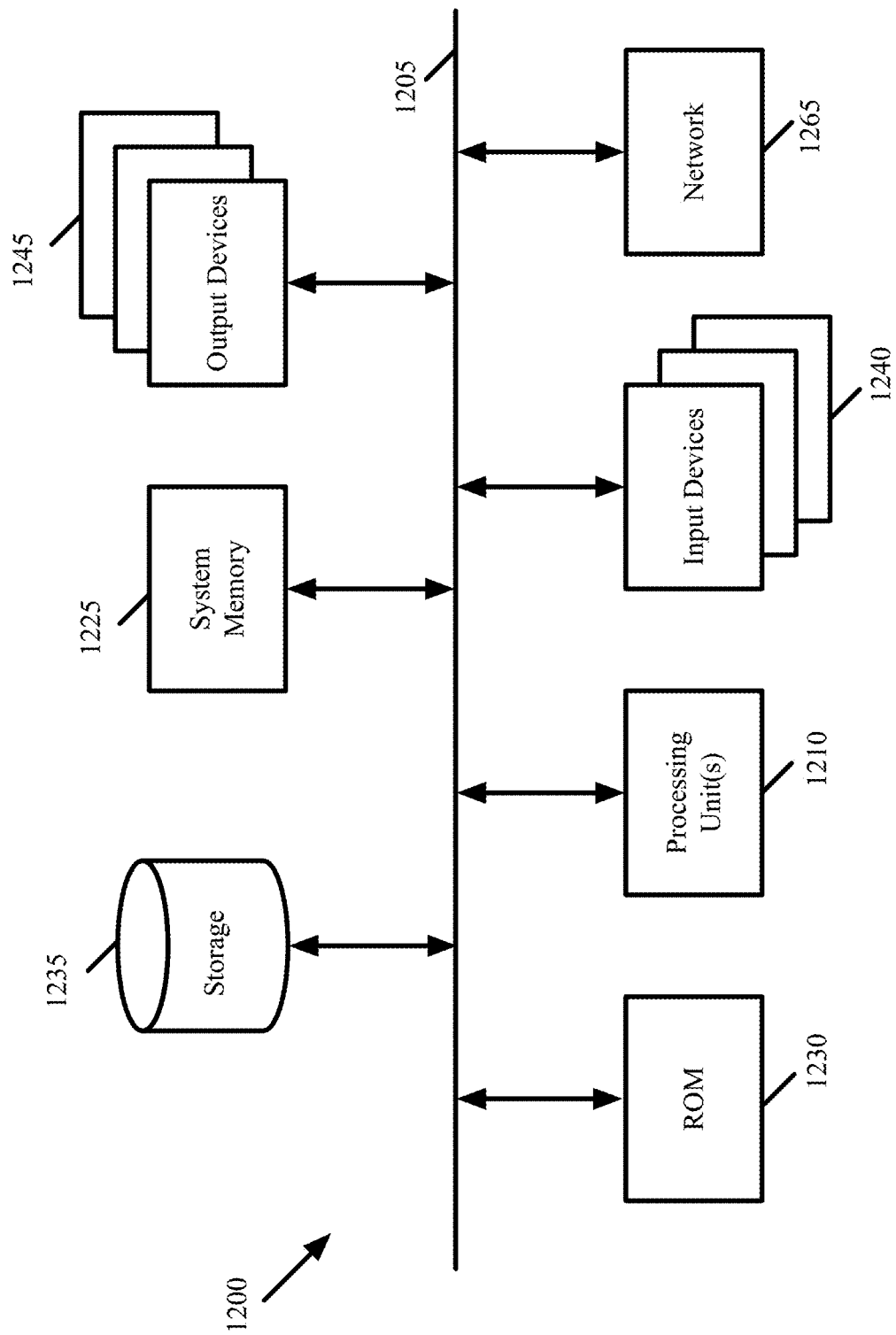
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for avoiding buffer congestion in a hardware forwarding element, the method comprising:
at the hardware forwarding element having (i) a plurality of ingress packet processing pipelines that process packets received from a set of network elements, (ii) a plurality of egress packet processing pipelines, and (iii) a traffic management circuit that connects the plurality of ingress packet processing pipelines to the plurality of egress packet processing pipelines:
adding a received packet to a buffer of the traffic management circuit, the buffer comprising (i) a single shared storage for storing packets that are each assigned one of a plurality of packet priorities by an ingress pipeline and (ii) a plurality of flow control thresholds each of which corresponds to a different packet priority, wherein the received packet is assigned a first priority of the plurality of packet priorities;
determining that adding the received packet to the buffer causes the buffer to exceed a particular flow control threshold corresponding to a second priority of the plurality of packet priorities, wherein the second priority is different than the first priority;
identifying a plurality of network elements that transmit, to the hardware forwarding element, packets that are assigned the second priority;
based on said determination that adding the received packet to the buffer causes the buffer to exceed a particular flow control threshold corresponding to a second priority, generating a flow control message for the second priority; and
transmitting the generated flow control message to the plurality of identified network elements.

2. The method of claim 1, wherein the buffer is shared between a plurality of ports.

3. The method of claim 1, wherein the buffer is shared between the plurality of egress packet processing pipelines of the hardware forwarding element.

4. The method of claim 3, wherein the plurality of egress packet processing pipelines are configurable.

5. The method of claim 3, wherein the plurality of egress packet processing pipelines comprise configurable match-action units.

6. The method of claim 1, wherein the buffer is a temporary storage for packets processed by one of the ingress packet processing pipelines prior to processing by one of the egress packet processing pipelines.

7. The method of claim 6, wherein the first priority value for the received packet is assigned by one of the ingress packet processing pipelines based on packet data.

8. The method of claim 1, wherein the traffic management circuit performs the adding, determining, identifying, and generating.

9. The method of claim 8, wherein the traffic management circuit is further for performing packet replication for broadcast and multicast packets.

10. The method of claim 9, wherein the traffic management circuit performs processing on a particular packet after the particular packet is processed by one of the plurality of ingress packet processing pipelines and prior to processing by one of the plurality of egress packet processing pipelines.

11. The method of claim 10, wherein when a broadcast packet is replicated by the traffic management circuit, at least two of the replicated packets are processed by different egress packet processing pipelines.

12. The method of claim 1, wherein the flow control message instructs the identified network elements to pause sending to the forwarding element further packets that are assigned the second priority.

13. The method of claim 1, wherein the plurality of network elements is a first plurality of network elements, the flow control message is a first flow control message, and the particular flow control threshold is a first flow control threshold, the method further comprising:
adding a received second packet to the buffer, the second packet assigned a third priority different from the first and second priorities;
determining that adding the second received packet to the buffer causes the buffer to exceed a second flow control threshold corresponding to the first priority;
identifying a second plurality of network elements that transmit, to the hardware forwarding element, packets that are assigned the first priority;
based on said determination, generating a second flow control message for the first priority; and
transmitting the generated second flow control message to the second plurality of identified network elements.

14. The method of claim 13, wherein the first flow control message for the second priority and the second flow control message for the first priority are sent to different sets of network elements.

15. A forwarding element comprising:
a plurality of ingress packet processing pipelines to process packets received from a set of network elements;
a plurality of egress packet processing pipelines;
a traffic management circuit to connect the plurality of ingress packet processing pipelines to the plurality of egress packet processing pipelines, the traffic management circuit comprising a buffer to store packet data for packets received by the hardware forwarding element after processing by one of the ingress packet processing pipelines and prior to processing by one of the egress packet processing pipelines, the buffer (i) comprising a single shared storage to store packets that are each assigned one of a plurality of packet priorities by the ingress pipeline that processed the packet and having a plurality of flow control thresholds each corresponding to a different packet priority, the traffic management circuit to:
add a received packet to the buffer, the received packet assigned a first priority of the plurality of packet priorities;
determine that adding the received packet to the buffer causes the buffer to exceed a particular flow control threshold corresponding to a second priority of the plurality of packet priorities that is different than the first priority; and
identify a plurality of network elements that transmit, to the hardware forwarding element, packets that are assigned the second priority; and
based on said determination that addition of the received packet to the buffer causes the buffer to exceed a particular flow control threshold corresponding to a second priority, initiate generation of a flow control message for the second priority to be transmitted to the plurality of identified network elements.

16. The forwarding element of claim 15, wherein the traffic management circuit is further to perform packet replication for broadcast and multicast packets.

17. The forwarding element of claim 15, wherein the flow control message is to instruct the identified network elements to pause sending to the forwarding element further packets that are assigned the second priority.

18. The forwarding element of claim 15, wherein the traffic management circuit is to initiate generation of the flow control message by notification of a separate set of circuitry of the forwarding element to generate the flow control message to be transmitted to the plurality of identified network elements.

19. The forwarding element of claim 15, wherein one of the network elements is one of a forwarding element, packet source, and packet destination.

* * * * *